United States Patent [19]
Etheridge

[11] Patent Number: 5,896,741
[45] Date of Patent: Apr. 27, 1999

[54] LOW EMISSION COMBUSTION SYSTEM FOR A GAS TURBINE ENGINE

[75] Inventor: Colin J. Etheridge, Chula Vista, Calif.

[73] Assignee: Solar Turbines Inc., San Diego, Calif.

[21] Appl. No.: 08/735,282

[22] Filed: Oct. 22, 1996

Related U.S. Application Data

[62] Division of application No. 08/427,920, Apr. 26, 1995, Pat. No. 5,749,217, which is a division of application No. 08/094,205, Dec. 26, 1991, Pat. No. 5,457,953.

[51] Int. Cl.$^6$ .................................................. F02C 9/18
[52] U.S. Cl. ........................................ 60/39.23; 60/39.29
[58] Field of Search .............................. 60/39.23, 39.29, 60/746, 747, 748

[56] References Cited

U.S. PATENT DOCUMENTS

| | | | |
|---|---|---|---|
| 3,643,431 | 2/1972 | Jamieson | 60/39.23 |
| 3,910,035 | 10/1975 | Juhasz | 60/39.23 |
| 4,446,692 | 5/1984 | Adkins | 60/39.23 |
| 4,766,721 | 8/1988 | Iizuka et al. | 60/747 |

*Primary Examiner*—Louis J. Casaregola
*Attorney, Agent, or Firm*—Larry G. Cain

[57] ABSTRACT

The control systems for reducing NOx in the combustion systems of past gas turbine engines has incorporated a variety of expensive and complicated techniques to reduce the NOx level. For example, such systems use schemes for introducing more air into the primary combustion zone, recirculating cooled exhaust products into the combustion zone and injecting water spray into the combustion zone. The present system reduces the formation of NOx within the combustion zone by controlling the air/fuel ratio and more explicitly by controlling the air portion of the air/fuel ratio. The present system includes a device for directing a portion of the flow of compressed air exiting a compressor section into an injection nozzle and into a combustor, a device for reducing the flow of compressed air into the combustor. The system monitors an engine parameter, such as a power turbine inlet gas temperature, sends a signal to a computer which interpreters the signal and directs a second signal to a power cylinder which causes a throttling mechanism to move between an open position and a closed position depending on the temperature of the gases. The system provides an economical, reliable and effective method for reducing and controlling the amount of nitrogen oxide, carbon monoxide and unburned hydrocarbon emitted from the gas turbine engine.

10 Claims, 4 Drawing Sheets

Fig_1.

Fig_3.

LOW EMISSION COMBUSTION SYSTEM FOR A GAS TURBINE ENGINE

This is a divisional application of application Ser. No. 08/427,920, filed Apr. 26, 1995, (U.S. Pat. No. 5,749,217) which is a division of application Ser. No. 08/094,205 filed Dec. 26, 1991 (U.S. Pat. No. 5,457,953).

TECHNICAL FIELD

The present invention relates to a system for automatically maintaining gas turbine nitrogen oxide (NOx), carbon monoxide (CO) and unburned hydrocarbon (UHC) emissions below specific levels in parts per million by volume during all ambient conditions for no load to full load operating parameters. More particularly, the invention relates to a system for controlling the combustible air to be mixed with the fuel to control the air to fuel ratio.

BACKGROUND ART

The use of fossil fuel as the combustible fuel in gas turbine engines results in the combustion products of carbon monoxide, carbon dioxide, water vapor, smoke and particulates, unburned hydrocarbons, nitrogen oxides and sulfur oxides. Of these above products, carbon dioxide and water vapor are considered normal and unobjectionable. In most applications, governmental imposed regulation have and are further restricting the amount of pollutants being emitted in the exhaust gases.

In the past the majority of the products of combustion have been controlled by design modifications. For example, smoke is normally controlled by design modifications in the combustor, particulates are normally controlled by traps and filters, and sulfur oxides are normally controlled by the selection of fuels being low in total sulfur. This leaves carbon monoxide, unburned hydrocarbons and nitrogen oxides as the emissions of primary concern in the exhaust gases being emitted from the gas turbine engine.

Oxides of nitrogen are produced in two ways in conventional combustion systems. For example, by the direct combination of atmospheric nitrogen and oxygen at the high temperatures occurring in the combustion zone and the presence of organic nitrogen in the fuel causes the production of nitrogen oxides. The rates with which nitrogen oxides form depend upon the flame temperature and, consequently, a small reduction in flame temperature will result in a large reduction in the nitrogen oxides.

Past and some present systems provide means for reducing the maximum temperature in the combustion zone of a gas turbine combustor have included schemes for introducing more air at the primary combustion zone, recirculating cooled exhaust products into the combustion zone and injecting water spray into the combustion zone. An example of such a system is disclosed in U.S. Pat. No. 4,733,527 issued on Mar. 29, 1988 to Harry A. Kidd. The method and apparatus disclosed therein automatically maintains the NOx emissions at a substantially constant level during all ambient conditions and for no load to full load fuel flows. The water/fuel ratio is calculated for a substantially constant level of NOx emissions at the given operating conditions and, knowing the actual fuel flow to the gas turbine, a signal is generated representing the water metering valve position necessary to inject the proper water flow into the combustor to achieve the desired water/fuel ratio.

Another example of a method and apparatus for reducing NOx emissions is disclosed in U.S. Pat. No. 4,215,535 issued on Aug. 5, 1980 to George D. Lewis. In this patent, the apparatus has a combination of serpentine geometried, fuel-mixing tubes discharging to the radially outward area of the combustor and an axially oriented, fuel-mixing tube near the center of the combustor are adapted to generate a strong centrifugal force field within the combustor. The tube near the center has a convergent section and a divergent section. A fuel supply means discharges fuel into the convergent section wherein vaporization of liquid fuel is aided by a differential axial velocity over the length of the tube. The force field promotes rapid mixing and combustion within the chamber to reduce both the magnitude of the combustor temperature and the period of exposure of the medium gases to that temperature, thus, reducing the formation of NOx.

Another method for reducing the formation and emission of NOx is disclosed in U.S. Pat. No. 3,842,597 issued Oct. 22, 1974 to Frederic Franklin Ehrich. This patent teaches a means for bleeding and cooling a portion of the airflow pressurized by the compressor which is then introduced into the primary combustion zone of the combustor in order to reduce the flame temperature effecting a reduction in the rate of formation of oxides of nitrogen.

The above systems are examples of attempts to reduce the emissions of oxides of nitrogen. Many of the attempts have resulted in additional expensive components. For example, the Kidd concept requires an additional means for injecting water into the combustion chamber which includes a water source, a control valve, a controlling and monitoring system and a device for injecting water into the combustion chamber. The Lewis concept requires a plurality of fuel-mixing tubes or injectors, a control system for each tube and a monitoring system with feedback to each of the controls of individual tubes. The Ehrich concept requires additional components to bleed and cool a portion of the airflow pressured by the compressor and hardware to reintroducing the cooled air into the combustor.

DISCLOSURE OF THE INVENTION

In one aspect of the invention a control system for reducing the formation of exhaust emissions during the operation of a gas turbine engine is disclosed. The engine includes a source of compressed air, a combustor and a turbine arranged in serial order. The engine further includes at least one fuel injection nozzle for directing a combustible fuel and compressed air into the combustor. The control system is comprised of means for directing air from the source of compressed air through the injection nozzle and into the combustor, in an amount sufficient, with the addition of an appropriate amount of fuel, to support full fuel operation of the gas turbine engine at rated speed. Further comprised in the control system is means for controllably reducing the amount of air directed into the combustor. The control system vents a portion of the air from the injection nozzle when the engine is operated at less than full fuel or rated speed.

In another aspect of the invention a gas turbine engine has a control system for reducing the formation of exhaust emissions during operation of a gas turbine engine. The engine includes a source of compressed air, a combustor and a turbine arranged in serial order. The engine further includes at least one fuel injection nozzle directing a combustible fuel and compressed air into the combustor. The control system is comprised of means for directing air from the source of compressed air through the injection nozzle into the combustor, in an amount sufficient with the addition of an appropriate amount of fuel, to support full fuel operation of the gas turbine engine.

In another aspect of the invention a combustor is adapted for use in an engine. The engine has an outer housing, a compressor positioned within the outer housing which has a flow of compressed air exiting therefrom during operation of the engine. A turbine is positioned within the outer housing and is connected in driving relationship to the compressor. The combustor is comprised of an outer shell positioned within the outer housing, an inner shell positioned inwardly of the outer shell, an inlet end connected to the compressor and an outlet end connected to the turbine. The combustor is further comprised of at least one injection nozzle being generally positioned within the inlet end and being supported from the outer housing. The injection nozzle has a combustor end portion, an exterior end portion and a passage extending between the ends. The passage has a preestablished area through which a portion of the compressed air flows and the injection nozzle further has an orifice which has a preestablished area communicating with the passage. The injection nozzle further includes a source of fuel being connected with the passage and means for reducing the flow of compressed air entering into the combustor by venting a portion of the compressed air through the orifice.

In another aspect of the invention an annular combustor section includes a combustor having an outer shell, an inner shell positioned inwardly of the outer shell, an inlet end connected to the outer and inner shells, an outlet end defined by the outer and inner shells. The inlet end has a plurality of openings therein. The annular combustor section further includes a plurality of injection nozzles positioned within the plurality of openings. The injection nozzle has a combustor end portion, an exterior end portion and a passage extending between the ends. The passage has a preestablished area through which a portion of the compressed air flows. The annular combustor section further includes an orifice having a preestablished area communicating with the passage and a source of fuel is connected with the passage.

The operation of the system for reducing nitrogen oxide, carbon monoxide and unburned hydrocarbon emissions provides a simple, inexpensive and reliable system to reduce emissions. The system is based upon the fact that the rates with which nitrogen oxides form depends upon the flame temperature and, consequently, a small reduction in flame temperature will result in a large reduction in the nitrogen oxides. The system automatically maintains gas turbine nitrogen oxide, carbon monoxide and unburned hydrocarbon emissions at a specific level during all ambient conditions for no load to full or high load operating parameters.

BEST MODE FOR CARRYING OUT THE INVENTION

Figure 1:
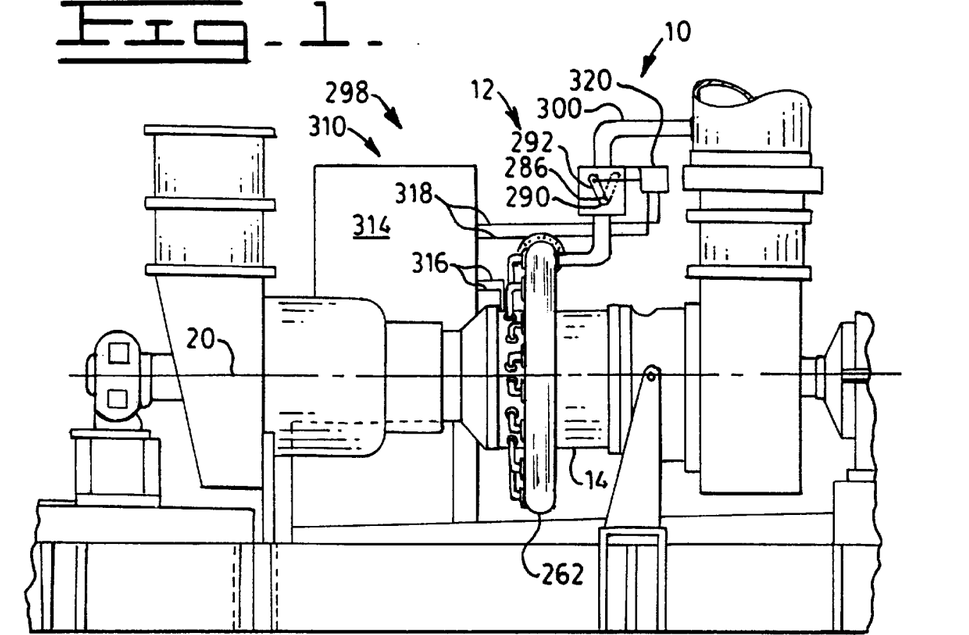
FIG. 1 is an external view of a gas turbine engine and control system having an embodiment of the present invention.
Figure 2:
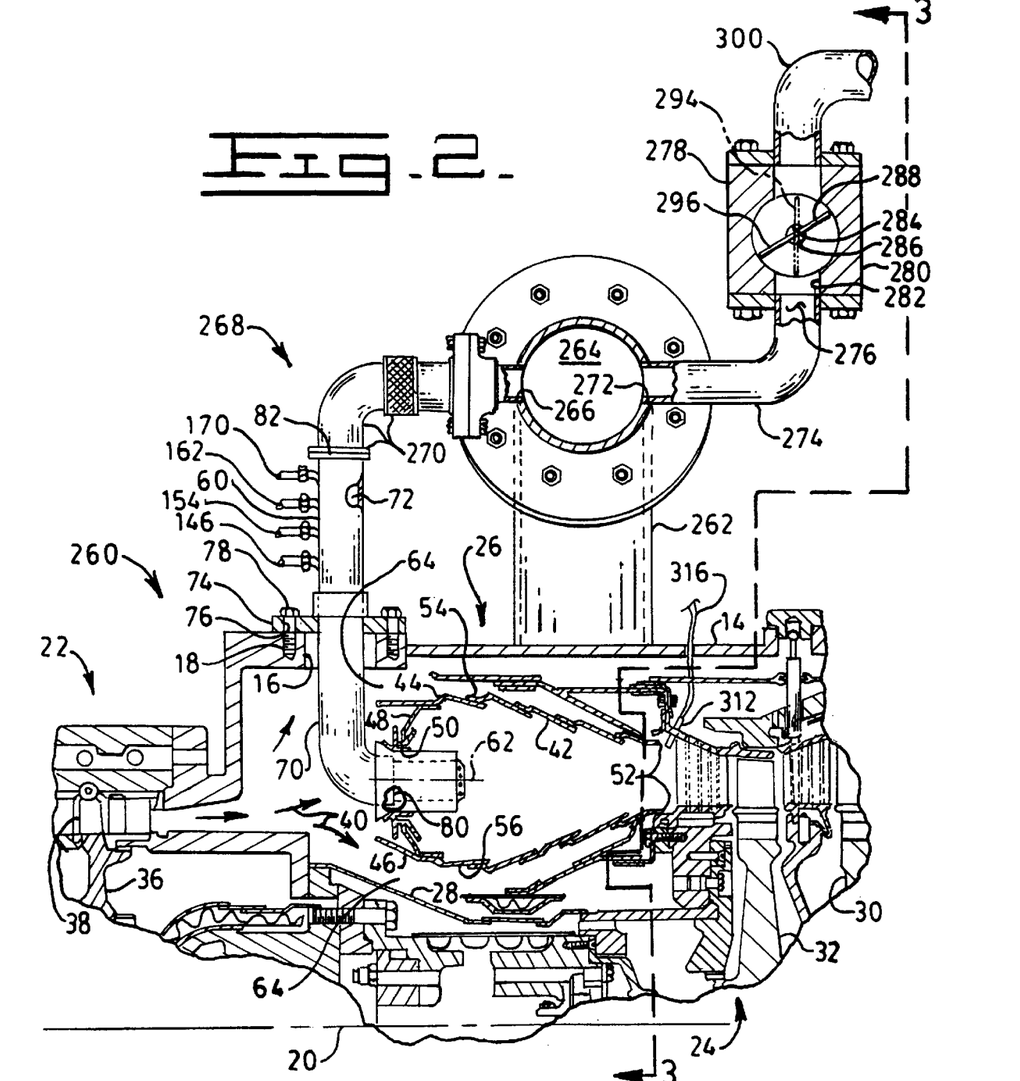
FIG. 2 is a partially sectioned side view of a gas turbine engine having an embodiment of the present invention.

In reference to FIG. 1 and 2, a gas turbine engine 10 having a control system 12 for reducing nitrogen oxide, carbon monoxide and unburned hydrocarbon emissions therefrom is shown. The gas turbine engine 10 has an outer housing 14 having therein a plurality of openings 16 having preestablished positions and relationship to each other and threaded holes 18 positioned relative to the plurality of openings 16. In this application, the housing 14 further includes a central axis 20 and is positioned about a compressor section 22 centered about the axis 20, a turbine section 24 centered about the axis 20 and a combustor section 26 interposed between the compressor section 22 and the turbine section 24. Functionally, the compressor section or source of compressed air 22 which enters into the combustor section 26 is mixed with a combustible fuel, burns and exits to the turbine section 24 to develop a power output must be in serial relationship. The engine 10 has an inner case 28 coaxially aligned about the axis 20 and is disposed radially inwardly of the combustor section 26. The turbine section 24 includes a power turbine 30 having an output shaft, not shown, connected thereto for driving an accessory component such as a generator. Another portion of the turbine section 24 includes a gas producer turbine 32 connected in driving relationship to the compressor section 22. The compressor section 22, in this application, includes an axial staged compressor 36 having a plurality of rows of rotor assemblies 38, of which only one is shown. When the engine 10 is operating, a flow of compressed air exits the compressor section designated by the arrows 40. As an alternative, the compressor section 22 could include a radial compressor or any suitable source for producing compressed air.

The combustor section 26 includes an annular combustor 42 being radially spaced a preestablished distance from the housing 14 and being supported from the housing 14 in a conventional manner. The combustor 42 has an annular outer shell 44 being coaxially positioned about the central axis 20, an annular inner shell 46 being positioned radially inwardly of the outer shell 44 and being coaxially positioned about the central axis 20, an inlet end portion 48 having a plurality of generally evenly spaced openings 50 therein and an outlet end portion 52. The outer shell 44 has an outer surface 54 and the inner shell has an outer surface 56 extending generally between the inlet end 48 and the outlet end 52. Each of the openings 50 has an injection nozzle 60 having a central axis 62 being generally positioned therein in communication with the inlet end 48 of the combustor 42. The area between the outer housing 14 and the inner case 28 less the area of the annular combustor 42 forms a preestablished cooling area 64 through which a portion of the compressed air will flow. In this application, approximately 20 to 50 percent of the compressed air is used for cooling. As an alternative to the annular combustor 42, a plurality of can type combustors or a side canular combustor could be incorporated without changing the gist of the invention.

Figure 4:
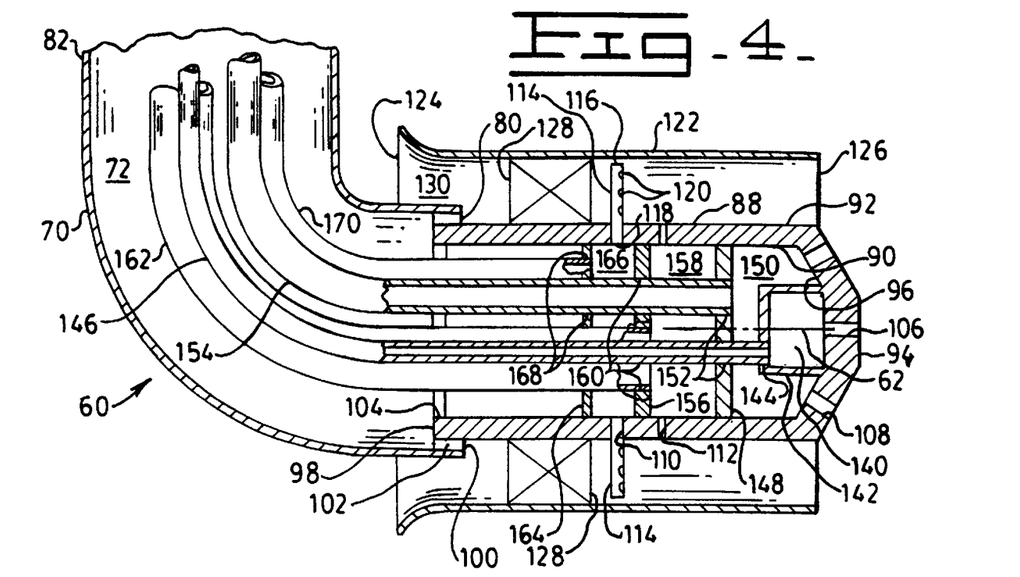
FIG. 4 is an enlarged sectional view of a dual fuel injector use in one embodiment of the resent invention.

A best shown in FIG. 4, in this application each of the injection nozzles 60 are of the dual fuel type and is supported from the housing 14 in a conventional manner. For example, each of the nozzles 60 includes an outer tubular member 70 having a tube passage 72 therein. The tubular member 70 extends radially through one of the plurality of openings 16 in the housing 14 and has a mounting flange 74 extending therefrom. The flange 74 has a pair of holes 76 therein to receive a pair of bolts 78 for threadedly attaching within the threaded holes 16 in the housing 14. Thus, the nozzle 60 is removably attached to the housing 14. The tubular member 70 further includes a combustor end portion 80 and an exterior end portion 82. The nozzle 60 further includes a generally cylindrical main body 88 having an inner surface 90, an outer surface 92, an injector end wall 94 having an inside surface 96 and an inlet end 98 at least partially positioned in the combustor end portion 80 of the tubular member 70. A plurality of spokes 100 having a preestablished length are generally evenly spaced about the main body 88 and are fixedly attached to the main body 88 and the tubular member 70. Thus, an orifice 102 having a preestablished area through which a portion of the compressed air can flow is formed between the main body 88 and the tubular member 70. The compressed air within the orifice 102 is in fluid communication with the tube passage 72 within the tubular member 70. The inlet end 98 of the main body 88 has a generally centered relative large hole 104 defined therein and the injector end wall 94 has a central passage 106 for liquid pilot fuel positioned coaxial with the central axis 62 and a plurality of angled passages 108 for gaseous pilot fuel radially spaced about the central passage 106. Positioned in the main body 88 intermediate the end 94,98 is a first set of holes 110 for a low emissions gaseous fuel injection mode extending radially between the inner surface 90 and the outer surface 92 and a second set of holes 112 for a low emissions liquid fuel injection mode axially spaced from the first set of holes 110 also extend radially between the inner surface 90 and the outer surface 92. Positioned in the first set of holes 110 and extending radially from the outer surface 92 of the main body 88 is a plurality of hollow spoke members 114. Each of the spoke members 114 have a preestablished length, a first end 116 which is closed and a second end 118 which is open. A plurality of passages 120 are axially spaced along each of the spoke members 114 and are in fluid communication with the hollow portion of each of the spoke members 114. The plurality of passages 120 are positioned in such a manner so as to face toward the injector end wall 94 of the main body 88 and the first closed end 116 positioned radially away from the outer surface 92 of the main body 88. Radially spaced about the main body 88 and spaced from the first closed end 116 of the spoke members 114 is an outer cylindrical member 122 having a flared air inlet end 124 and a combustor end 126. The air inlet end 124 is generally coaxially positioned about the combustor end portion 80 of the tubular member 70 and is supported from the main body 88 by a plurality of swirlers 128. A main air passage 130 is formed between the outer cylindrical member 122 and outer surface 92 of the main body 88. The main air passage 130 extends between the inlet end 124 and the combustor end 126 and has a preestablished area through which a portion of the compressed air can flow. In this application, approximately 50 to 80 percent of the compressed air enters into the preestablished area between the outer cylindrical member 122 and the outer surface 92 of the main body 88. The flow of compressed air through the main air passage 130 into the combustor 40 is an amount sufficient with the addition of an appropriate amount of fuel to support full load operation of the gas turbine engine 10. Furthermore, in this application the preestablished cross sectional area of the orifice 102, which is in fluid communication with the main air passage 130, is equal to approximately 15 to 35 percent of the cross sectional area of the preestablished area between the outer cylindrical member 122 and the main body 88.

The injection nozzle 60 further includes a liquid pilot reservoir 140 formed within the main body 88. A generally cup shaped member 142 is sealing attached to an inside surface 96 of the injector end wall 94 and has an opening 144 therein. A liquid pilot fuel tube 146 has one end sealingly attached to the opening 144 and communicates with a liquid fuel source, not shown. A portion of the liquid pilot fuel tube 146 extends through the tube passage 72 in the tubular member 70 and sealing exits the tubular member 70 externally of the housing 14 for communicating with the liquid fuel source. The liquid fuel within the pilot fuel tube 146 communicates with the liquid fuel reservoir 140 and the central passage 106. Further positioned within the main body 88 is a first plate 148 sealingly attached to the inner surface 90 and axially spaced from the inside surface 96 of the injector end wall 94 and interposed between the inside surface 96 and the first set of holes 110 resulting in the formation of a gaseous pilot fuel reservoir 150. A pair of openings 152 are defined in the first plate 148. One of the openings 152 has the liquid pilot fuel tube 146 sealing extending therethrough. The other of the openings 152 has one end of a gaseous pilot fuel tube 154 sealingly attached thereto. The gaseous pilot reservoir 150 within the main body 88 is generally defined by the inner surface 90 of the main body 88, the inside surface 96 of the injector end wall 94, the periphery of the cup shaped member 142 and the first plate 148. A portion of the gaseous pilot fuel tube 154 extends through the tube passage 72 in the tubular member 70 and sealingly exits the tubular member 70 externally of the housing 14 for communicating with the source of gaseous fuel. The gaseous fuel within the gaseous pilot fuel tube 154 is in fluid communication with a source of gaseous fuel, not shown, and communicates with the gaseous pilot fuel reservoir 150 and the plurality of angled passages 108 within the injector end wall 94 of the main body 88. Further positioned in the main body 88 is a second plate 156 sealingly attached to the inner surface 90 of the main body 88 and axially interposed between the first set of holes 110 and the second set of holes 112 forming a main gaseous fuel reservoir 158. The second plate 156 defines a plurality of openings 160 therein. One the plurality of openings 160 has the liquid pilot fuel tube 146 sealingly extending therethrough and another one of the plurality of openings 160 has the gaseous pilot fuel tube 154 sealingly extending therethrough. Another one of the plurality of openings 160 has one end of a main gaseous fuel tube 162 sealingly attached thereto. The main gaseous fuel reservoir 158 is generally defined by the inner surface 90 of the main body 88, the first plate 148 and the second plate 156. A portion of the main gaseous fuel tube 162 is positioned in the tube passage 72 within the tubular member 70 and sealingly exits the tube passage 72 externally of the housing 14 fluidly communicating with the gaseous fuel source. The gaseous fuel within the main gaseous fuel tube 162 is in fluid communication with the source of gaseous fuel, the main gaseous fuel reservoir 158 and the plurality of passages 120 in the plurality of hollow spoke members 114. Further positioned within the main body 88 is a third plate 164 axially spaced from the second plate 156 and interposed between the second set of holes 112 and the inlet end 98 of the main body 88 forming a liquid fuel reservoir 166. The third plate 164 defines a plurality of openings 168 therein. One of the plurality of openings 168 has the liquid pilot fuel tube 146 sealingly extending therethrough and another one of the plurality of openings 168 has the gaseous pilot fuel tube 154 sealingly extending therethrough. Another one of the plurality of openings 168 has the main gaseous fuel tube 162 sealingly extending therethrough and another one of the plurality of openings 168 has one end of a main liquid fuel tube 170 attached thereto. The liquid fuel reservoir 166 is generally defined by the inner surface 90 of the main body 88, the second plate 156 and the third plate 164. A portion of the main liquid fuel tube 170 extends through the tube passage 72 in the tubular member 70 and sealing exits the tubular member 70 externally of the housing 14 fluidly communicating with the liquid fuel source. The liquid fuel within the main liquid fuel tube 170 is in fluid communication with the source of liquid fuel, the liquid fuel reservoir 166 and the second set of holes 112 within the main body 88.

Figure 5:
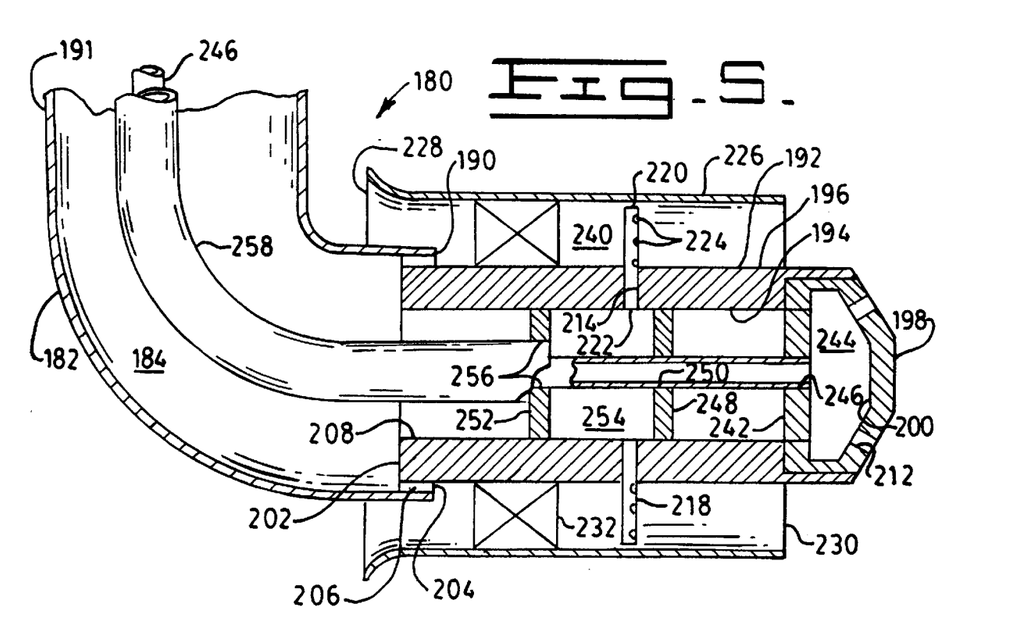
FIG. 5 is an enlarged sectional view of an alternate embodiment of a single fuel injector used in one embodiment of the present invention.

As an alternative and best shown in FIG. 5, a single fuel type gaseous injection nozzle 180 can be used in place of the dual fuel injection nozzle 60. Where applicable, the nomenclature used to identify the single fuel type injection nozzle is identical to that used to identify the dual fuel type injection nozzle 60, however the numbers are different. Each of the nozzles 180 is supported from the housing 14 in a conventional manner. For example, each of the nozzles 180 includes an outer tubular member 182 having a tube passage 184 therein. The tubular member 182 extends radially through one of the plurality of openings 16 in the housing 14 and has a mounting flange, not shown, extending therefrom. The flange has a pair of holes therein to receive the pair of bolts 78 for threadedly attaching within the threaded holes 16 in the housing 14 and is identical to the mounting flange used with the dual fuel injection nozzle 60. Thus, the nozzle 180 is removably attached to the housing 14. The tubular member 182 further includes a combustor end portion 190 and an exterior end portion 191. The nozzle 180 further includes a generally cylindrical main body 192 having an inner surface 194, an outer surface 196, a combustor end wall 198 having an inside surface 200 and an inlet end 202 at least partially positioned in the combustor end portion 190 of the tubular member 182. A plurality of spokes 204 having a preestablished length are generally evenly spaced about the main body 192 and are fixedly attached to the main body 192 and the tubular member 182. Thus, an orifice 206 having a preestablished area through which a portion of the compressed air can flow is formed between the main body 192 and the tubular member 182. The compressed air within the orifice 206 is in fluid communication with the tube passage 184 within the tubular member 182. The inlet end 202 of the main body 192 has generally centered therein a relative large hole 208 and the combustor end wall 198 has a plurality of angled passages 212 arranged in a circular array therein. Positioned in the main body 192 intermediate the ends 198,202 is a set of holes 214 extending between the inner surface 194 and the outer surface 196. Positioned in the set of holes 214 and extending radially from the outer surface 196 of the main body 192 is a plurality of hollow spoke members 218. Each of the plurality of spoke members 218 have a preestablished length, a first end 220 which is closed and a second end 222 which is open. A plurality of passages 224 are axially spaced along each of the spoke members 218 and are in fluid communication with the hollow portion of each of the spoke member 218. The plurality of passages 224 are positioned in such a manner so as to face toward the combustor end wall 198 of the main body 192 and have the first closed end 220 positioned away from the outer surface 196 of the main body 192. Radially spaced about the main body 192 and spaced from the first closed end 220 of the spoke members 218 is an outer cylindrical member 226 having a flared air inlet end 228 and a combustor end 230. The air inlet end 228 is generally coaxially positioned about the combustor end portion 190 of the tubular member 182 and is supported from the main body 192 by a plurality of swirlers 232. A main air passage 240 is formed between the outer cylindrical member 226 and the outer surface 196 of the main body 192. The main air passage 240 extends axially between the combustor end 230 and the flared air inlet end 228 and has a preestablished area through which a portion of the compressed air can flow. In this application, approximately 50 to 80 percent of the compressed air enters into the preestablished area between the outer cylindrical member 226 and the outer surface 196 of the main body 192. The flow of compressed air through the main air passage 240 into the combustor 40 is an amount sufficient, with the addition of an appropriate amount of fuel, to support full load operation of the gas turbine engine 10. Furthermore, in this application the preestablished cross sectional area of the orifice 206, which is in fluid communication with the main air passage 240 having the preestablished area, is equal to approximately 15 to 35 percent of the cross sectional area of the preestablished area between the outer cylindrical member 226 and the main body 192.

The injection nozzle 180 further includes a first plate 242 sealingly attached to the inner surface 194 and axially spaced from the inside surface 200 of the combustor end wall 198 and interposed between the inside surface 200 and the set of holes 214 resulting in the formation of a gaseous pilot fuel reservoir 244. An opening 246 is defined in the first plate 242 and has one end of a gaseous pilot fuel tube 246 sealingly attached thereto. The gaseous pilot reservoir 244 within the main body 192 is generally defined by the inner surface 194 of the main body 192, the inside surface 200 of the combustor end wall 198 and the first plate 242. A portion of the gaseous pilot fuel tube 246 extends through the tube passage 184 in the tubular member 182 and sealingly exits the tubular member 182 externally of the housing 14 fluidly communicating with the gaseous fuel source. The gaseous fuel within the gaseous pilot fuel tube 246 is in fluid communication with the source of gaseous fuel and communicates with the gaseous pilot fuel reservoir 244 and the plurality of angled passages 212 within the combustor end wall 198 of the main body 192. Further positioned in the main body 192 is a second plate 248 sealingly attached to the inner surface 194 of the main body 192 and axially interposed between the set of holes 214 and the first plate 242. The second plate 248 defines an opening 250 therein through which the gaseous pilot fuel tube 246 sealingly extending. Further positioned within the main body 182 is a third plate 252 axially spaced from the second plate 248 and interposed between the set of holes 214 and the inlet end 202 of the main body 192 forming a main gaseous fuel reservoir 254. The third plate 252 defines a pair of openings 256 therein. One of the pair of openings 256 has the gaseous pilot fuel tube sealingly extending therethrough and the other of the pair of openings 256 has one end of a main gaseous fuel tube 258 attached thereto. The main gaseous fuel reservoir 254 is generally defined by the inner surface 194 of the main body 192, the second plate 248 and the third plate 252. A portion of the main gaseous fuel tube 258 extends through the tube passage 184 in the tubular member 182 and sealing exits the tubular member 182. The gaseous fuel within the main gaseous fuel tube 258 is in fluid communication with the source of gaseous fuel, the main gaseous fuel reservoir 254 and the set of holes 214 within the main body 192.

The control system 12 for reducing nitrogen oxide, carbon monoxide and unburned hydrocarbon emissions from the gas turbine engine 10 includes means 260 for directing a portion of the flow of compressed air exiting the compressor section 22 through the injection nozzle 60,180 into the inlet end 48 of the combustor 42. The means 260 for directing a portion of the flow of compressed air includes the outer housing 14, and the outer shell 44, the inlet end 48 and the inner shell 46 of the combustor section 26. The preestablished spaced relationship of the outer and inner shells 44,46 of the combustor 42 to the outer housing 14 and the inner case 28 which forms the preestablished flow areas between the combustor 42, and the outer housing 14 and the inner case 26 is also a part of the means 260.

Figure 3:
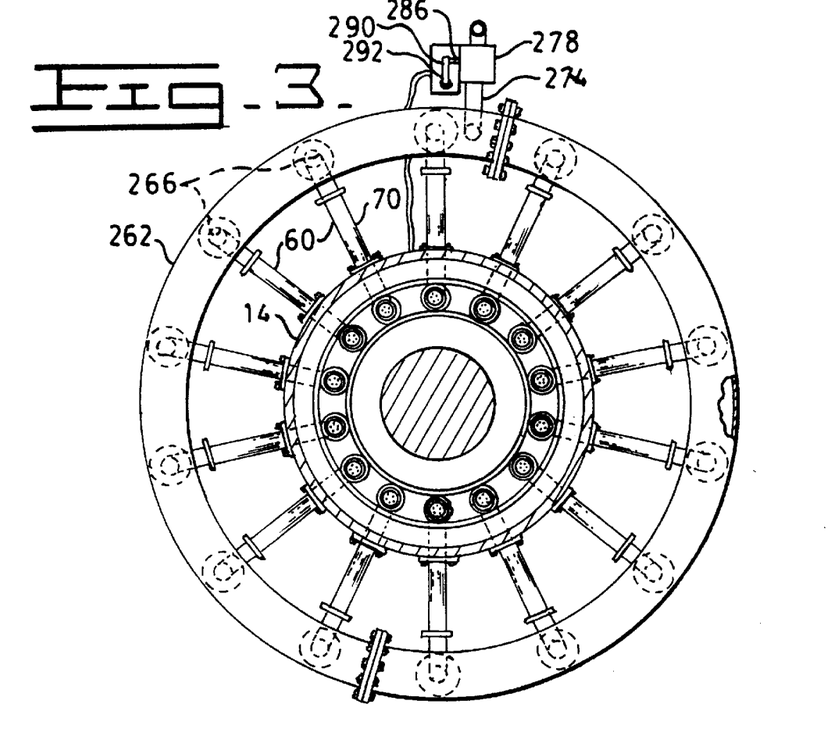
FIG. 3 is a partially sectioned end view taken through line 3—3 of FIG. 2.

As best shown in FIGS. 1, 2 and 3, the control system 12 for reducing nitrogen oxide, carbon monoxide and unburned hydrocarbon emissions from the engine 10 further includes a manifold 262 having a passage 264 therein. The manifold 262 is positioned externally of the outer housing 14 and encircles the outer housing 14. A plurality of openings 266 in the manifold correspond in location to the location of each of the tubular members 70,182. The tubular members 70,182 form a part of a means 268 for ducting and are in attached communication with the plurality of openings 266 in the manifold 262. Thus, the passage 264 within the manifold 262 is in fluid communication with compressed air inside the tube passage 72,184 of the tubular member 70,182. The means 268 for ducting includes a plurality of elbows, flanges and connectors 270. The manifold 262 further includes an outlet opening 272 having a duct 274 attached thereto. The duct 274 has a passage 276 therein which is in fluid communication with passage 264 in the manifold 262. Attached to the duct 274 is a valve 278. In this application, the valve 278 is of the conventional butterfly type but could be of any conventional design. The valve 278 includes a housing 280 having a passage 282 therein. Further included in the housing 280 is a through bore 284 and a pair of bearings, not shown, are secured in the bore 284. A shaft 286 is rotatably positioned within the bearings and has a throttling mechanism 288 attached thereto and positioned within the passage 282. The shaft 286 has a first end 290 extending externally of the housing 280. A lever 292 is attached to the first end 290 of the shaft 286 and movement of the lever 292 causes the throttling mechanism 288 to move between a closed position 294 and an open position 296.

Further included with the control system 12 for reducing nitrogen oxide, carbon monoxide and unburned hydrocarbon emissions is means 298 for controllably reducing the amount of air directed into the combustor 40. The air is bled from the injection nozzle 60,180 when the engine 10 is operating at lower power levels. The means 298 for reducing includes the following components. The main air passage 130,240 having the preestablished area formed between the outer cylindrical member 122,226 and the main body 88,192 of each injector 60,180. The orifice 102,206 having the preestablished area and formed between the main body 88,180 and the tubular member 70,182 of the injector 60,180. The tube passage 72,184 within the tubular member 70,182 and the passage 264 in the manifold 262 are also a part of the control system 12. The passage 276 within the duct 274 and the passage 282 in the housing 280. Furthermore the throttling mechanism 288 within the passage 282 is included in the means 298 for bleeding. In this application, the passage 282 is connected to the exhaust outlet from the engine 10 by a connector 300 and is into the exhaust.

Further included with the control system 12 for reducing nitrogen oxide, carbon monoxide and unburned hydrocarbon emissions is means 310 for monitoring and controlling the portion of the flow of compressed air bleed from the injection nozzle 60,180. The means 310 for monitoring and controlling includes a sensor 312 positioned within the engine 10 which monitors the power turbine 30 inlet temperature. As an alternative, many parameters of the engine such as load or speed could be used as the monitored parameter. The sensor 312 is connected to a control box or computer 314 by a plurality of wires 316 wherein a signal from the sensor 312 is interpreted and a second signal is sent through a plurality of wires 318 to a power cylinder 320. In this application, the power cylinder 320 is a hydroelectric cylinder, but as an alternative could be an electric solenoid. The power cylinder 320 moves the lever 292 and the corresponding throttling mechanism 288 between the open position 296 and the closed position 294. When the power turbine 30 inlet temperature reaches a preestablished temperature, which corresponds to a combustion temperature in the range of about 2700 to 3140 degrees Fahrenheit, the valve 278 increases the amount of compressed air bled from the injector 60,180. In this application, the movement of the throttling mechanism 288 is infinitely variable between the open position 296 and the closed position 294. However, as an option, the movement of the throttling mechanism 288 can be movable between the closed position 294 and the open position 296 through a plurality of preestablished stepped positions.

Figure 6:
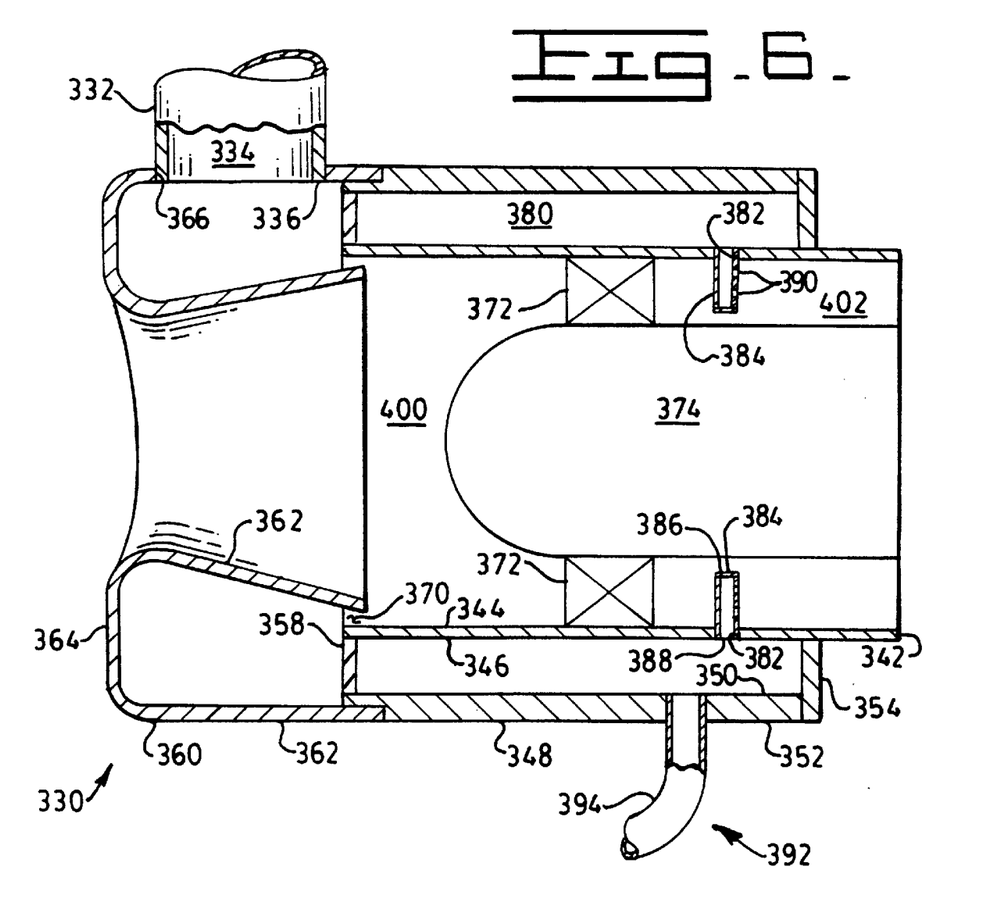
FIG. 6 is an enlarged sectional view of an alternative embodiment of a single fuel injector used in one embodiment of the present invention.

As best shown in FIG. 6, an alternate injection nozzle 330 is shown. This injection nozzle 330 includes an outer tubular member 332 having a tube passage 334 therein. The tubular member 332 extends radially through one of the plurality of openings 16 in the housing 14 and has a mounting flange, not shown extending therefrom. The flange has a pair of holes therein to receive the pair of bolts 78 for threadedly attaching within the threaded holes 16 in the housing 14. Thus, the nozzle 330 is removably attached to the housing 14. The tubular member 332 further includes a combustor end portion 336 and an external end portion 338. The nozzle 330 further includes a generally cylindrical hollow main body 340 having an inner wall 342 defining an inner surface 344 and an outer surface 346, an outer wall 348 defining an inner surface 350 and an outer surface 352, a combustor end portion 354 and a compressor end portion 358. A channel shaped member 360 includes an inlet portion 362 extending from a base 364. The inlet portion 362 is attached to the outer surface 352 of the outer wall 348 of the main body 340 near the compressor end portion 358 and has an aperture 366 defined therein. The inlet portion 362 is positioned in spaced relationship to the inner surface 344 of the inner wall 342 of the main body 340 and forms an orifice 370 therebetween having a preestablished area through which a portion of the compressed air can flow. The orifice 370 is formed between the main body 340 and the inlet portion 362. The combustor end portion 336 of the outer tube member 332 is coaxially aligned with the aperture 366 and is fixedly attached to the channel member 360. The tube passage 334 is in fluid communication with the orifice 370. A plurality of swirler vanes 372 having a preestablished length and shape are generally evenly spaced about the inner surface 344 of the inner wall 342 and have one end fixedly attached thereto. A deflector member 374 is radially, inwardly, coaxially positioned within the main body 340 and is fixedly attached to the other end of each of the plurality of swirler vanes 372. A main fuel gallery 380 is formed internally of the main body 340. For example, the main fuel gallery 380 is defined by the outer surface 346 of the inner wall 342, the combustor end portion 358, the inner surface 350 of the outer wall 348 and the compressor end portion 358. Positioned in the inner wall 342 of the main body 340 intermediate the end 354,358 is a set of holes 382 extending radially between the inner surface 344 and the outer surface 346. Positioned in the set of holes 382 and extending radially from the inner surface 344 of the inner wall 342 is a plurality of hollow spoke members 384. Each of the spoke members 384 have a preestablished length, a first end 386 which is closed and a second end 388 which is open. A plurality of passages 390 are axially spaced along each of the spoke members 384 and are in fluid communication with the hollow portion of each of the spoke members 384. The plurality of passages 390 are positioned in such a manner so as to inject fuel in a predetermined manner into the air stream and the first closed end 386 is positioned radially inwardly from the inner surface 344 of the inner wall 342. The injection nozzle 330 further includes a means 392 for communicating between the source of fuel and the main fuel gallery 380. The means 392 for communicating includes a tube 394 being in fluid communication between the main fuel gallery 380 and the source of fuel. One end of the tube 394 is attached to the main fuel gallery 380 and the other end of the tube 394 sealing exits the housing 14 for communicating with the fuel source.

A main air passage 400 having a preestablished area is formed inwardly of the inner surface 344 of the inner wall 342 of the main body 340 and extends axially between the combustor end portion 354 and the compressor end portion 358. The deflector member 374 is positioned within the main air passage 400 and restricts the amount of compressed air flowing therethrough and forms a secondary air passage 402 having a preestablished area. The secondary air passage 402 is interposed between the inner surface 344 and the deflector member 374. In this application, approximately 50 to 80 percent of the compressed air enters into the preestablished area of the main air passage 400. The flow of compressed air through the secondary air passage 402 into the combustor 40 is an amount sufficient, with the addition of an appropriate amount of fuel, to support full load operation of the gas turbine engine 10. Furthermore, in this application the preestablished cross sectional area of the orifice 370, which is in fluid communication with the main air passage 400, is equal to approximately 5 to 35 percent of the cross sectional area of the preestablished area between the main body 340 and the deflector member 374.

INDUSTRIAL APPLICABILITY

In use the gas turbine engine 10 is started and allowed to warm up and is used to produce either electrical power, pump gas, turn a mechanical drive unit or another application. As the demand for load or power produced by the generator is increased, the load on the engine 10 is increased and the control system 12 for reducing nitrogen oxide, carbon monoxide and unburned hydrocarbon emission is activated. In the start-up and warm up condition, the throttling mechanism 288 of the valve 278 is positioned in either the partly open 296 or closed 294 position and the minimum amount of compressed air is bled from the injection nozzle 60,180 and the maximum amount of compressed air enters the combustor 40. During the start and warm up condition the engine is in a high emissions mode and uses pilot only fuel. For example, the compressed air from the compressor section 26 flows between the outer housing 14 and the inner case 28 toward the inlet end 48 of the combustor 40 wherein a portion of the compressed air flows through the preestablished cooling area 64 formed between the outer housing 14 and the inner case 28 less the area of the combustor 40. The remainder of the air flows through the main air passage 130,240 or the secondary air passage 402 having the preestablished area formed between the outer cylindrical member 122,226 and the main body 88,192 or the deflector member 374 and the main body 340. With the throttling mechanism 288 in the fully open position 296, the maximum allowable flow of compressed air is directed through the path of least resistance to the exhaust by way of the orifice 102,206,370. This minimizes the amount of air directed through the preestablished area of the main air passage 130,240 or the secondary air passage 402 to the combustor 40. Thus, the fuel/air ratio and the temperature within the combustor 40 is controlled and the formation of nitrogen oxide, carbon monoxide and unburned hydrocarbon is minimized. As the the load on the engine 10 is increased, the amount of fuel injected into the combustor section 26 is increased, the fuel/air ratio changes and the combustion temperature within the combustor section 26 is increased. The results of the increase of combustion temperatures causes the temperature of the gases at the power turbine 30 inlet to increase. The sensor 312 sends a signal through the plurality of wires 316 to the computer 314 which is interpreted to indicated an increase in the power turbine 30 inlet temperature and a second signal is sent through the plurality of wires 318 to the power cylinder 320 causing the lever 292 and throttling mechanism 288 to move toward the closed position 294. This reduces the amount of air bled or vented from the nozzle and increases the amount of air directed to the combustor 40. The continued monitoring by the sensor 312 and interpretation by the computer 314 keeps the air/fuel ratio relative constant. In order to accelerate, the air/fuel ratio must change. In the air/fuel ratio, the relationship of the amount of fuel increases whereas the air remains constant. However, to control the temperature of combustion and the would be resulting increased emissions of nitrogen oxide, carbon monoxide and unburned hydrocarbon during combustion temperatures of generally between about 2700 to 3140 degrees Fahrenheit. The temperature of the gases entering into the turbine section 24 is monitored frequently and if the temperature reaches the range of between about 2700 to 3140 degrees Fahrenheit the temperature remains at this high temperature for only a short period of time. Thus, the emissions are controlled by the variation or change in air/fuel ratio resulting in high combustion temperatures. As the engine 10 accelerates, the high fuel position 296 is reached wherein the valve 278 has the lever 292 and throttling mechanism 288 fully closed preventing the flow of air through the passage 276. Thus, the flow of compressed air through the orifice 102,206,370 is prevented.

Other aspects, objectives and advantages of this invention can be obtained from a study of the drawings, the disclosure and the appended claims.

I claim:

1. A gas turbine engine having an exhaust being emitted therefrom and a control system for reducing the formation of exhaust emissions during operation of a gas turbine engine, the engine including a source of compressed air, a combustor defining an outer shell and an inner shell being coaxially positioned about the outer shell, an inlet end portion having a opening therein and a turbine arranged in serial order, a fuel injection nozzle being positioned in the opening in the inlet end portion of the combustor and said fuel injection nozzle having an apparatus directing a combustible fuel and directing compressed air into the combustor; said control system comprising:

said fuel injection nozzle defining a cylindrical main body having an outer surface, an outer cylindrical member being radially spaced from the cylindrical main body defining an air inlet end and having a passage being formed between the outer cylindrical member and the outer surface of the cylindrical main body, said air inlet end and said passage having a fixed preestablished area, said preestablished area being sized allowing about 25 percent of the compressed air entering the injection nozzle to be vented therefrom, said apparatus directing the combustible fuel into said passage;

means for directing air from the source of compressed air through the inlet end and the passage of the injection nozzle into the combustor in an amount sufficient, with the addition of an appropriate amount of fuel, to support full fuel operation of the gas turbine at rated speed;

means for controllably reducing the amount of air directed into the combustor by venting a portion of the air from said passage formed between the outer cylindrical member and the outer surface of the cylindrical main body of the injection nozzle when the engine is operated at less than full fuel or rated speed and said air vented from said passage being dumped into the exhaust.

2. The gas turbine engine of claim 1 wherein said means for controllably reducing the amount of air directed into the combustor by venting a portion of the air from the injection nozzle includes a valve connected to the injection nozzle.

3. The gas turbine engine of claim 2 wherein said connection between said valve and the injection nozzle includes a plurality of passages.

4. The gas turbine engine of claim 3 wherein said valve includes a butterfly type valve.

5. The gas turbine engine of claim 3 wherein said valve includes a housing and a lever positioned externally of the housing.

6. The gas turbine engine of claim 2 wherein said valve has a throttling mechanism being movable between and open position and a closed position.

7. The gas turbine engine of claim 2 wherein said valve has a throttling mechanism being movable between an open position and a closed position, said throttling mechanism being infinitely variable between the open position and the closed position.

8. A gas turbine engine having an exhaust being emitted therefrom and a control system for reducing the formation of exhaust emissions during operation of a gas turbine engine, the engine including a source of compressed air, a combustor defining an outer shell and an inner shell being coaxially positioned about the outer shell, an inlet end portion having a opening therein and a turbine arranged in serial order, a fuel injection nozzle being positioned in the opening in the inlet end portion of the combustor and said fuel injection nozzle having an apparatus directing a combustible fuel and directing compressed air into the combustor; said control system comprising:

said fuel injection nozzle defining a cylindrical main body having an outer surface, an outer cylindrical member being radially spaced from the cylindrical main body defining an air inlet end and having a passage being formed between the outer cylindrical member and the outer surface of the cylindrical main body, said air inlet end and said passage having a fixed preestablished area, said apparatus directing the combustible fuel into said passage;

means for directing air from the source of compressed air through the inlet end and the passage of the injection nozzle into the combustor in an amount sufficient, with the addition of an appropriate amount of fuel, to support full fuel operation of the gas turbine at rated speed;

means for controllably reducing the amount of air directed into the combustor by venting a portion of the air from said passage formed between the outer cylindrical member and the outer surface of the cylindrical main body of the injection nozzle when the engine is operated at less than full fuel or rated speed and said means for controllably reducing the amount of air directed into the combustor includes a manifold having a passage therein and circling the outer housing, said manifold having a outlet opening therein a valve being connected to the outlet opening and to the exhaust, each of said injection nozzles having one of a main air passage and a secondary air passage with a preestablished area through which a portion of the compressed air can enter, and orifice having a preestablished area through which a portion of the compressed air can be vented and a tube passage being connected to the orifice and the passage.

9. The gas turbine engine of claim 8 wherein said valve has a throttling mechanism therein being movable between an open position and a closed position and said position between the open position and the closed position being dependent on the operating parameters of the gas turbine engine.

10. The gas turbine engine of claim 8 wherein one valve controls the portion of the flow of compressed air vented from all of the injection nozzles.

* * * * *